(12) United States Patent
Qin et al.

(10) Patent No.: US 9,108,616 B2
(45) Date of Patent: Aug. 18, 2015

(54) TORQUE TRANSMITTING DEVICE AND POWERTRAIN INCORPORATING A PERMANENT MAGNET MOTOR

(71) Applicant: Johnson Electric S.A., Murten (CH)

(72) Inventors: Ruifeng Qin, Hong Kong (CN); Chengshun Du, Shenzhen (CN); Linan Li, Shenzhen (CN); Fayun Qi, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 35 days.

(21) Appl. No.: 14/073,085

(22) Filed: Nov. 6, 2013

(65) Prior Publication Data

US 2014/0128216 A1    May 8, 2014

(30) Foreign Application Priority Data

Nov. 6, 2012    (CN) .................. 2012 2 0579199 U

(51) Int. Cl.

| | |
|---|---|
| *B60W 10/02* | (2006.01) |
| *B60W 10/08* | (2006.01) |
| *H02K 1/17* | (2006.01) |
| *H02K 7/108* | (2006.01) |
| *H02K 23/04* | (2006.01) |
| *H02K 7/00* | (2006.01) |

(52) U.S. Cl.
   CPC ............... *B60W 10/02* (2013.01); *B60W 10/08* (2013.01); *H02K 1/17* (2013.01); *H02K 7/006* (2013.01); *H02K 23/04* (2013.01); *H02K 7/108* (2013.01); *H02K 2213/03* (2013.01); *Y10S 903/902* (2013.01); *Y10T 477/26* (2015.01)

(58) Field of Classification Search
   CPC ......... B60W 10/02; H02K 1/17; H02K 7/108; H02K 7/116; H02K 5/04; H02K 5/24
   See application file for complete search history.

(56) References Cited

U.S. PATENT DOCUMENTS

| | | | | |
|---|---|---|---|---|
| 5,234,091 A | * | 8/1993 | Kobayashi et al. | 475/206 |
| 8,049,387 B2 | * | 11/2011 | Wong et al. | 310/154.22 |
| 8,063,529 B2 | | 11/2011 | Wong et al. | |
| 8,274,189 B2 | | 9/2012 | Qin et al. | |
| 2005/0167224 A1 | * | 8/2005 | Puiu | 192/35 |
| 2008/0115997 A1 | * | 5/2008 | Banno et al. | 180/242 |
| 2009/0258751 A1 | * | 10/2009 | Porter et al. | 475/231 |
| 2010/0072849 A1 | * | 3/2010 | Wong et al. | 310/154.22 |
| 2011/0140554 A1 | * | 6/2011 | Wong et al. | 310/72 |
| 2012/0029779 A1 | * | 2/2012 | Dickinson et al. | 475/86 |

FOREIGN PATENT DOCUMENTS

CN    101685990 A    3/2010

* cited by examiner

*Primary Examiner* — Jacob S Scott

(74) *Attorney, Agent, or Firm* — Muncy, Geissler, Olds & Lowe, P.C.

(57) ABSTRACT

A motor (21) includes a stator (30) and a rotor (40). The stator includes a housing (31) accommodating magnet(s) (32) and including multiple sidewalls (33) and connecting portions (34) adjoining neighboring sidewalls. A sidewall includes zero or more flat segment (35, 38) and zero or more curved segments (38, 36) having one or more radii. A connecting portion includes a substantially flat segment or a curved segment having one or more radii and adjoins two neighboring sidewalls. A torque transmitting device (15) includes the motor and a clutch (22) actuated by the motor to transmit or cease transmitting engine (11) output to driven mechanism(s) (17, 18, 12, 13, 14). A powertrain includes the torque transmitting device to switch between drive modes with the torque transmitting device to engage or disengage engine output with axles.

17 Claims, 12 Drawing Sheets

TORQUE TRANSMITTING DEVICE AND POWERTRAIN INCORPORATING A PERMANENT MAGNET MOTOR

CROSS REFERENCE TO RELATED APPLICATION(S)

This application claims the benefit of Chinese patent application serial no. 201220579199.4 having a filing date of Nov. 6, 2012. This U.S. patent application is also cross-related to U.S. Pat. No. 8,274,189 issued on Sep. 25, 2012 and entitled "Motor and Window Lift". The content of the aforementioned patent application and U.S. patent is hereby incorporated by reference in its entirety for all purposes.

BACKGROUND

All-wheel-drive motor vehicles have become popular in situations where traction between the wheels and the road is less than ideal or than desirable. Nonetheless, all-wheel-drive powertrains usually consume more energy due to the transmission of engine output to, for example, both the front axles and the rear axles of a motor vehicle. On the other hand, two-wheel drive powertrains usually are more energy efficient because they only need to transmit the engine output to either the front axles (e.g., front-wheel-drive motor vehicles) or the rear axles (e.g., rear-wheel-drive motor vehicles). Some modern motor vehicles include powertrains that switch between the all-wheel-drive mode and the front-wheel-drive (or rear-wheel-drive) mode to have the benefit of both the conventional all-wheel-drive and the conventional front-wheel-drive (or rear-wheel-drive) powertrains.

Such a powertrains often includes a torque transmission device for distributing power between the front axle and the rear axle to enable the switches between the all-wheel-drive mode and the front-wheel-drive (or rear-wheel-drive) mode. A conventional torque transmission device usually includes a motor driven clutch assembly to engage or disengage the engine output with either the front axles or the rear axles. A conventional motor usually includes a cylindrical stator housing that accommodates a rotor therewithin. Such a cylindrical stator housing has exhibited larger magnitudes of vibration and higher levels of noise when the cylindrical stator housing is subject to some input forces either from external sources or from the operations of the motor itself. Moreover, the space allocated for the motor and other components may be constrained in some modern applications, whereas the output requirements for the motor may nevertheless continue to rise. That is, the power density requirement in some modern applications has continued to rise.

Therefore, what is needed is an improved motor that exhibits lower levels of noise and lower magnitudes of vibration, an improved torque transmission device having the improved motor, and a powertrain including the improved torque transmission device.

SUMMARY OF THE INVENTION

Some first embodiments are directed to a torque transmitting device including a clutch assembly that comprises a driven member and a driving member and an motor that is operatively coupled to one of the driven member and the driving member of the clutch assembly to engage the driven member with the driving member. The driving member may be operatively coupled to the motor that actuates the driving member of the clutch assembly to move toward and engage or disengage with the driven member of the clutch assembly in some of the first embodiments. Alternatively, the driven member may be operatively coupled to the motor that actuates the driven member of the clutch assembly to move toward and engage or disengage with the driving member of the clutch assembly. One of the driving member and the driven member of the clutch assembly may be operatively coupled to a gear assembly including a gear and pinion.

The electric motor includes a rotor, which includes a shaft and a field coil wound around a portion of the shaft, and a stator surrounding at least a portion of the rotor. The stator may include a housing, which includes at least three sidewall sections and at least three connecting portions, and a first magnet disposed within the housing. A connecting portion may be disposed between two adjacent sidewall sections of the at least three sidewall sections. A sidewall section may comprise a first curved segment having a first radius of curvature. The first magnet may be attached to at least a portion of an internal surface of a first connecting portion of the at least three connecting portions. A sidewall section may have a curved segment, a straight segment, or a combination of one or more curved segments and one or more straight segments in a cross-sectional view as illustrated in at least some of FIGS. 4-8 and 11-12. A connecting portion may have a curved segment, a straight segment, or a combination of one or more curved segments and one or more straight segments in a cross-sectional view as illustrated in FIGS. 4-8 and 11-12.

The torque transmitting device may further optionally comprise a hydraulic assembly, which is operatively coupled to the motor, and an actuator that is operatively coupled to the hydraulic assembly and to the one of the driving member and the driven member of the clutch assembly. In some of the first embodiments, the torque transmitting device may also optionally include a gear assembly that comprises a gear and a pinion and is operatively coupled to the driving member of the clutch assembly A connecting portion of the at least three connecting portions of the housing of the stator of the motor may optionally comprise a second curved segment adjoining two neighboring sidewall sections and having a second radius of curvature in a range between 1% and 80% of the first radius of curvature. In addition or in the alternative, a connecting portion of the at least three connecting portions of the housing of the stator of the motor may comprise a substantially flat segment and adjoin two neighboring sidewall sections of the at least three sidewall sections. Moreover, a sidewall section of the at least three sidewall sections of the housing of the stator of the motor may further optionally comprise a second curved segment having a second radius of curvature, and having a first end adjoining the first curved segment and a second end adjoining a neighboring connecting portion of the at least three connecting portions.

In addition to the first magnet, the motor may optionally include a second magnet disposed within the housing and attached to at least a portion of an internal surface of a second connecting portion of the at least three connecting portions. The first magnet of the motor may be devised or configured in a way to maintain a spacing from a first magnet surface facing the rotor to an external surface of the rotor in some of the first embodiments, wherein the spacing may vary along a circumferential direction with respect to the axis of shaft of the rotor based at least in part upon a radial thickness of the first magnet along a radial direction emanating from and perpendicular to the axis of shaft of the rotor. In addition or in the alternative, the first magnet of the motor may comprise a central portion and two end portions sandwiching the central portion in some of the first embodiments. In these embodiments, a radial thickness of the central portion along a radial direction emanating from the axis of the shaft of the rotor is greater than a radial thickness of the two end portions.

Some second embodiments are directed at a powertrain for vehicles including a torque transmitting device described here. The powertrain includes an engine or a motor (collectively "engine" hereinafter), a drive shaft, which comprises a first end portion that is operatively coupled to the engine of the vehicle powertrain and a first set of axles driving one or more first final drives, a torque transmitting device operatively coupled to a second end portion of the drive shaft as described above in at least some of the first embodiments, and a second set of axles that is operatively coupled to the torque transmitting device to drive one or more second final drives of the vehicle. As shown in various embodiments described herein, the motor may receive instructions from a controller to actuate the clutch assembly of the torque transmitting device in order to engage and disengage the drive shaft with the second set of axles and thus effectively switch between different drive modes of the powertrain (e.g., the all-wheel-drive mode where both the first set of axles and the second set of axles are driving their respective final drives or the two-wheel-drive mode where, for example, the second set of axles is not receiving the output from the engine to drive the one or more second final drives).

More details about the rotatory device are described in the Detailed Description section with reference to FIGS. 1-12 as provided below.

BRIEF DESCRIPTION OF THE FIGURES

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered which are illustrated in the accompanying drawings. These drawings depict only exemplary embodiments and are not therefore to be considered limiting of the scope of the claims.

DETAILED DESCRIPTION

Figure 1:
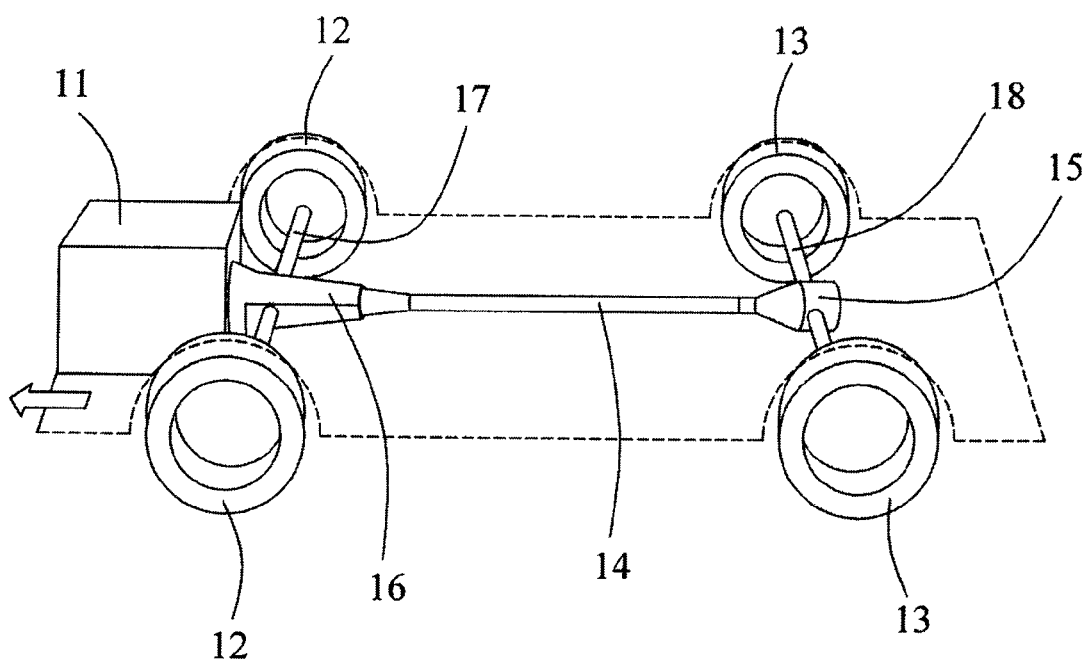
FIG. 1 is a simplified, exemplary schematic diagram illustrating a motor vehicle powertrain.

Various features are described hereinafter with reference to the figures. It shall be noted that the figures are not necessarily drawn to scale, and that the elements of similar structures or functions are represented by like reference numerals throughout the figures. It shall also be noted that the figures are only intended to facilitate the description of the features for illustration and explanation purposes, unless otherwise specifically recited in one or more specific embodiments or claimed in one or more specific claims. The drawings figures and various embodiments described herein are not intended as an exhaustive illustration or description of various other embodiments or as a limitation on the scope of the claims or the scope of some other embodiments that are apparent to one of ordinary skills in the art in view of the embodiments described in the Application. In addition, an illustrated embodiment need not have all the aspects or advantages shown.

An aspect or an advantage described in conjunction with a particular embodiment is not necessarily limited to that embodiment and may be practiced in any other embodiments, even if not so illustrated, or if not explicitly described. Also, reference throughout this specification to "some embodiments" or "other embodiments" means that a particular feature, structure, material, process, or characteristic described in connection with the embodiments is included in at least one embodiment. Thus, the appearances of the phrase "in some embodiments", "in one or more embodiments", or "in other embodiments" in various places throughout this specification are not necessarily referring to the same embodiment or embodiments.

FIG. 1 is a simplified schematic diagram illustrating a motor vehicle drive train or powertrain (collectively powertrain hereinafter). More specifically, FIG. 1 illustrates a schematic of an exemplary powertrain having a four wheel drive (4WD) or all-wheel drive (AWD) system. The exemplary powertrain illustrated in FIG. 1 includes an engine 11, a first pair of final drive 12 (e.g., a first pair of drive wheels, rather than driven wheels) coupled to engine 11 through a gearbox 16 (e.g., a reduction gearbox). In these embodiments illustrated in FIG. 1, the output from engine 11 is transferred to the first pair of final drive 12 through the reduction gearbox 16. Moreover, the reduction gearbox 16 transfers the output of the engine 11 in at least two parts.

One part of the output of engine 11 is transmitted from the engine 11 to the gearbox 16, which in turn transmits the engine output to the front axle 17 and finally to the first pair of final drive 12. Another part of the output from engine 11 is transmitted to the drive shaft 14 that is operatively coupled to a torque transmission device 15. The torque transmission device 15 is further operatively coupled to a rear axle or rear tandem axle 18 (hereinafter rear axle) to drive a second pair of final drive 13 (e.g., the pair of rear wheels) in these illustrated embodiments. It shall be noted that the torque transmission device 15 may include a differential or a transfer case in order to allow, for example, the inside and outside wheels (relative to the center of a turn) to rotate at different speeds to accommodate, for example, vehicle's making turns.

In some of these embodiments illustrated in FIG. 1, the torque transmission device 15 engages or disengages the drive shaft 14 from the rear axle 18 according to, for example, instructions from the driver or other control means for determining whether all wheel drive is needed or desired. In the event when the torque transmission device 15 receives the instructions and causes the drive shaft 14 to engage the rear axle 18 to drive the second pair of final drive 13, the output of the engine 11 is transmitted from the drive shaft 14 to the second pair of final drive 13, and thus the engine 11 drives both the front wheels and the rear wheels. In the event when the torque transmission device 15 receives the instructions and causes the drive shaft 14 disengage the rear axle 18, the engine output is disconnected from and thus does not drive the second pair of final drive 13. In this situation, the powertrain is a front-wheel drive mode.

It shall be noted that the engine 11 referred herein includes any machine that converts energy into useful mechanical motion such as, but not limited to an internal combustion engine, an electric or pneumatic motor, a heat engine, etc. It shall be noted that a typical all-wheel drive system may include a powertrain that includes a differential between the front and rear drive shafts to allow the front and rear wheels to spin or rotate at different speeds. In contrast, in a typical four wheel drive system, the first pair of final drive 12 and the second pair of final drive 13 rotate or spin at the same speed in order to achieve higher traction. Nonetheless, various embodiments in this application use the terms "all-wheel drive" and "four-wheel drive" interchangeably, unless otherwise specifically recited or claimed.

Figure 2:
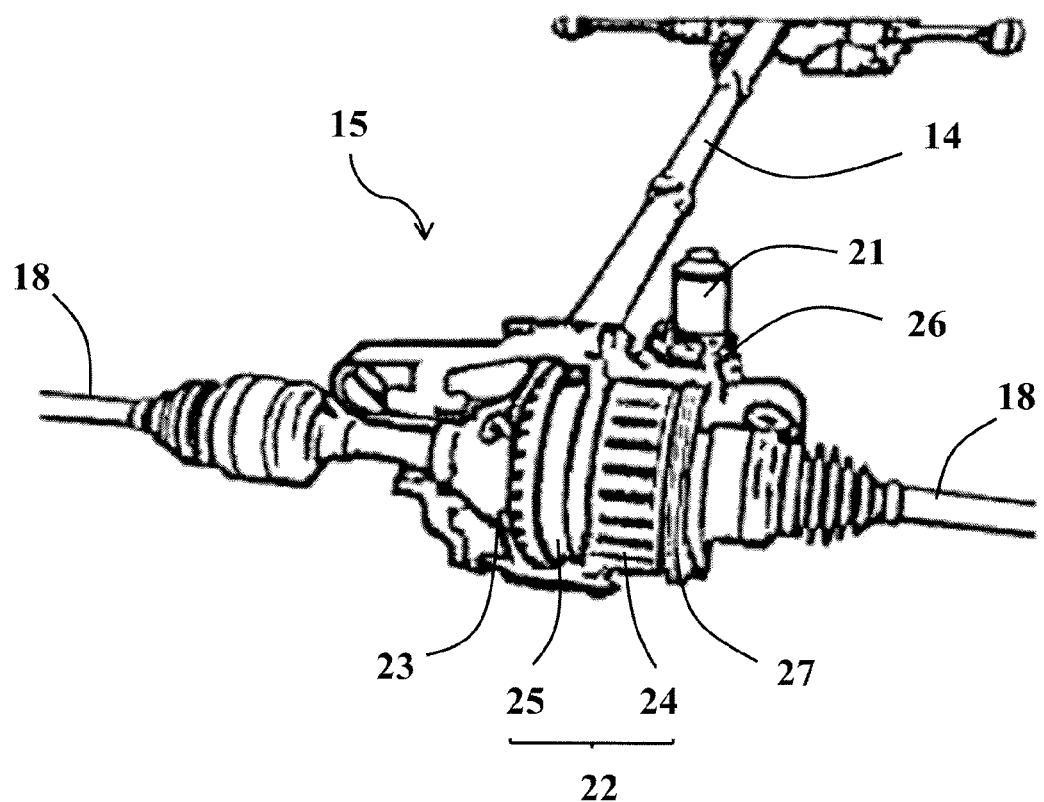
FIG. 2 illustrates a perspective view of an exemplary torque transmitting device in some embodiments.

FIG. 2 illustrates a perspective view of an exemplary torque transmitting device in some embodiments. In these embodiments illustrated in FIG. 2, the exemplary torque transmitting device 15 includes a motor 21, a clutch assembly 22, and a gear assembly 23. In some of these embodiments, the torque transmitting device 15 may include a permanent magnet motor 21. In some of these embodiments, the gear assembly 23 may include a ring gear and pinion assembly to change the direction of mechanical motions in order to drive the axle 18. In some of these embodiments illustrated in FIG. 2, the clutch assembly 22 may include a first portion 24 and a second portion 25, where the motor 21 is operatively coupled to and thus drives the first portion 24 to move along an axial direction of the axle 18 toward or away from the second portion 25 of the clutch assembly 22, thereby engaging or disengaging the pair of final drive 13 operatively coupled to the axle 18. In these embodiments, the second portion 25 of the clutch assembly 22 is operatively coupled to the gear assembly 23. In the alternative, the motor 21 may be operatively coupled to the second portion 25 to engage and disengage the second portion 25 with the first portion 24.

The first portion 24 of the clutch assembly 22 provides output power of the engine (e.g., engine 11) to axle 18 and may be called the driven member of the clutch assembly 22. The second portion 25 is usually operatively coupled to the gear assembly 23 and may also be called a driving member of the clutch assembly 22. The motor 21 operates to cause the driving member 25 and the driven member 24 of the clutch assembly 22 to engage or disengage with each other. The exemplary torque transmitting device 15 may further include a controller (not shown) to control the motor 21 in some of these embodiments illustrated in FIG. 2. In these embodiments, the controller receives instructions from, for example, the driver or other control means for determining whether all-wheel-drive is needed or desired and uses the received instructions to control motor 21.

For example, a driver may issue the instruction to switch the powertrain from the front-wheel-drive mode to the all-wheel-drive mode by, for example, pressing a physical button or a graphically illustrated button in a user interface, actuating a lever or a shifter, etc. When the controller receives the instruction, the controller may issue a command to the motor 21 to cause the first portion 24 of the clutch assembly 22 to move toward and finally become engaged with the second portion 25 of the clutch assembly 22. When the first portion 24 engages with the second portion 25, the drive shaft 14 is operatively engaged with the axle 18 through the clutch assembly 22 of the exemplary torque transmitting device 15, and the output of the engine (e.g., engine 11 in FIG. 1) is transmitted to the axle 18 to drive the final drive operatively coupled to axle 18. In the embodiments where axle 18 constitutes the rear axle 18 of FIG. 1, the powertrain is now an all-wheel-drive mode.

As another example, a driver may issue the instruction to switch the powertrain from the all-wheel-drive mode to the front-wheel-drive mode by, for example, pressing a physical button or a graphically illustrated button in a user interface, actuating a lever or a shifter, etc. When the controller receives the instruction, the controller may issue a command to the motor 21 to cause the first portion 24 of the clutch assembly 22 to move away from and become disengaged with the second portion 25 of the clutch assembly 22. When the first portion 24 is disengaged with the second portion 25, the drive shaft 14 is operatively disengaged with the axle 18 through the clutch assembly 22 of the exemplary torque transmitting device 15, and the output of the engine (e.g., engine 11 in FIG. 1) is no longer transmitted to the axle 18 to drive the final drive operatively coupled to axle 18. In the embodiments where axle 18 constitutes the rear axle 18 of FIG. 1, the powertrain is now a front-wheel-drive mode.

In some of these embodiments, the exemplary torque transmitting device 15 may further include a hydraulic system 26 operatively coupled to and driven by the motor 21 to actuate an actuator 27 (e.g., a piston) that in turn actuates and thus engages or disengages the first portion 24 with the second portion 25 of the clutch assembly 22. It shall be noted that the use of a motor (e.g., 21) and a hydraulic system 26 to actuate a piston 27 to engage or disengage the clutch assembly 22 is presented as an example and is not intended to limit the scope of the claims or the scope of other embodiments or implementations, unless otherwise specifically claimed or recited. It shall also be noted that the use of other means to engage or disengage the clutch assembly 22 is also contemplated in other embodiments. For example, a servo motor, a pneumatic system, etc. may also be used to actuate the clutch assembly 22 to achieve substantially similar purposes in other embodiments.

Figure 3:
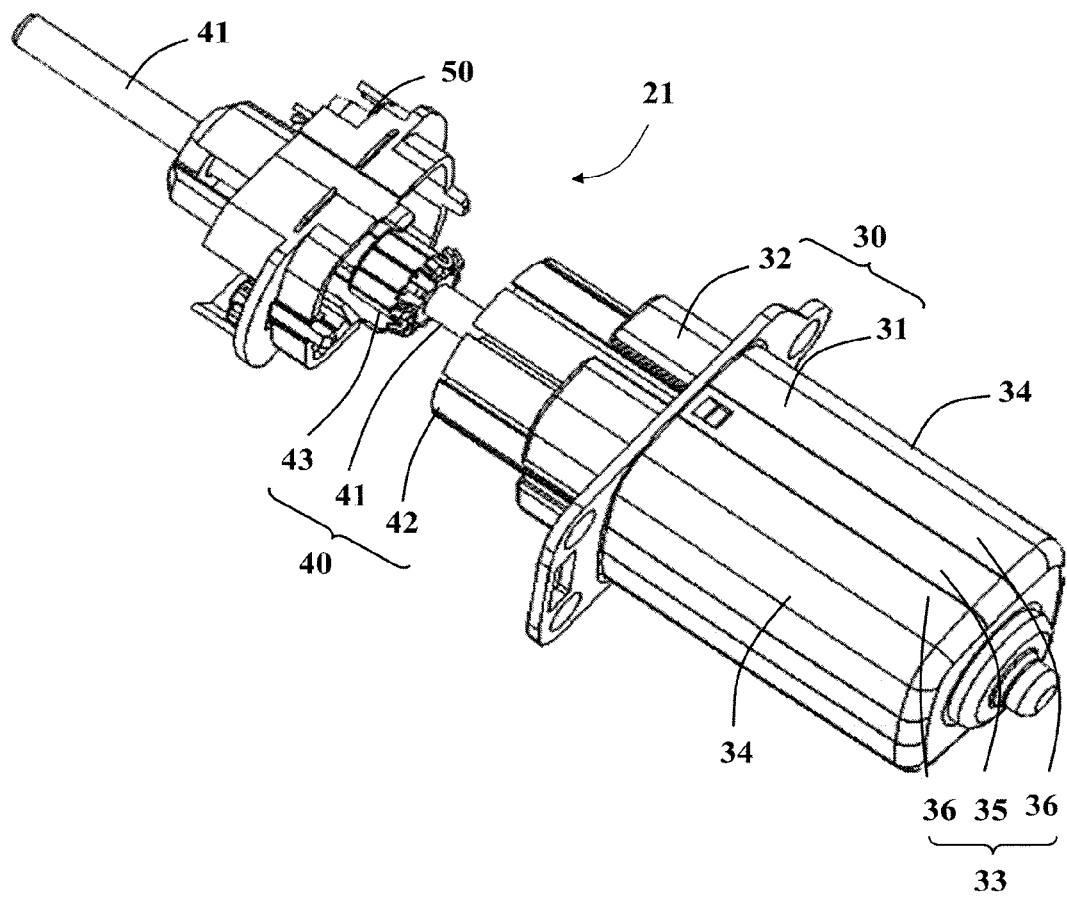
FIG. 3 illustrates an exploded view of an exemplary motor in some embodiments.

FIG. 3 illustrates an exploded view of an exemplary motor in some embodiments. More specifically, the exemplary motor 21 illustrated in FIG. 3 includes a stator 30, a rotor 40, and an end cap 50. The stator 30 in the exemplary motor 21 may include a housing 31 and one or more magnets 32 in these embodiments illustrated in FIG. 3. In addition or in the alternative, the rotor 40 may include a shaft 41, an armature 42 fixedly attached to the shaft 41, and a commutator 43.

In these embodiments, the rotor 40 may further include a field coil, a field winding, or a magnet sub-assembly (collectively a field coil hereinafter) fixedly attached to the armature 42 and electrically connected to the commutator 43. During operation of the motor 21, the rotor 40 rotates or spins with respect to the stator 30 within the housing 31. The end cap 50 is attached to one end of the housing 31 to enclose the internal components of the motor 21 in these embodiments.

Figure 4:
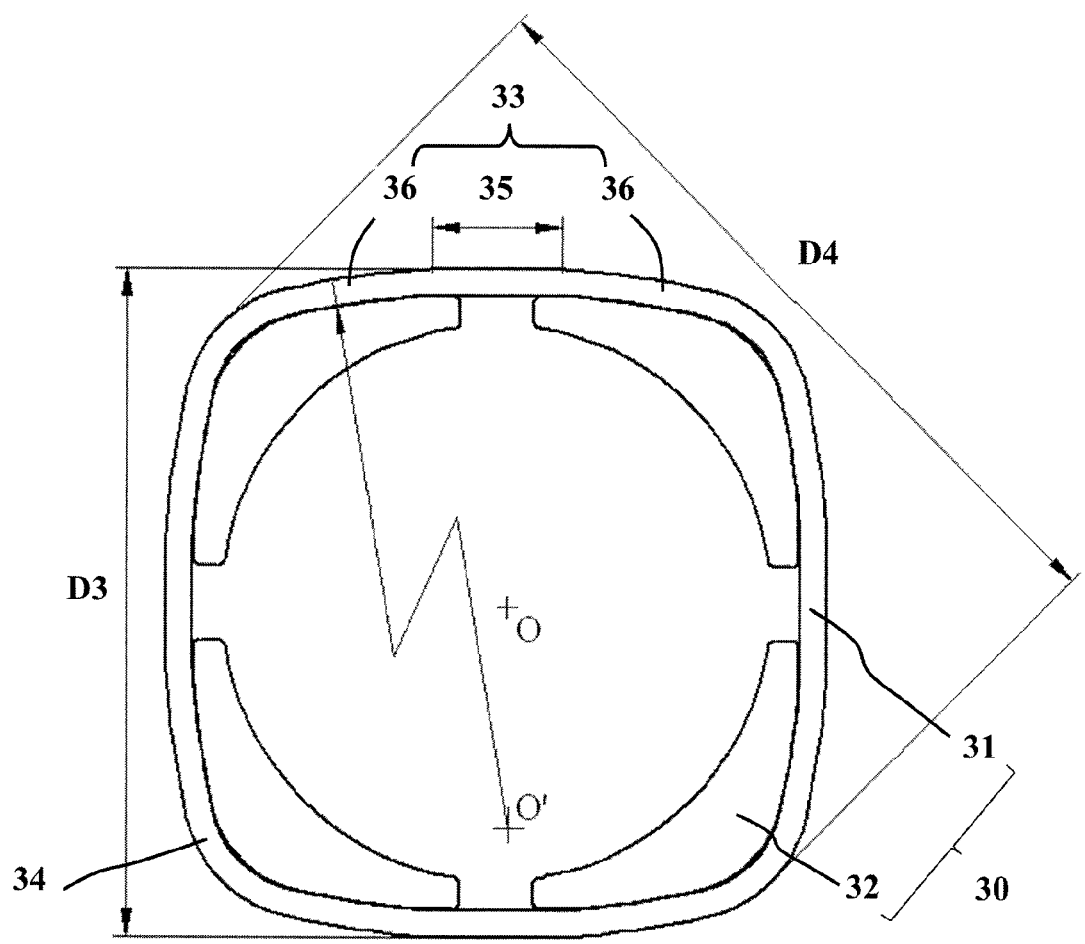
FIG. 4 illustrates a cross-sectional view of an exemplary implementation of the stator of the exemplary motor illustrated in FIG. 3 in some embodiments.

FIG. 4 illustrates a cross-sectional view of the stator 30 of the exemplary motor illustrated 21 in FIG. 3 in some embodiments. In some embodiments, the one or more of magnets 32 for the stator 30 are positioned relative to the corners of the housing 31 for better space utilization or for accommodating a larger rotor 40 for the exemplary motors 21. More particularly, the stator 30 illustrated in FIG. 4 includes the housing 31, which further includes four sections of sidewalls 33 and four connecting portions 34, each of which connects two immediately neighboring sidewall sections 33 in these illustrated embodiments.

In some of these embodiments, a sidewall section 33 may include a sidewall section 33 includes a substantially flat plate- or sheet-like structure 35 and further include two curved or arcuate section 36 on both ends joining the corresponding connecting portions 34 to form a substantially smooth transition between a curved or arcuate section 36 and the corresponding connecting portion 34. In these embodiments, a curved or arcuate section 36 or a connecting portion 34 may comprise one or more arcuate segments, each having its own radius of curvature. In some other embodiments, the cross-section of the housing 31 may include a polygonal profile having three or more curved or arcuate sections 36 and formed or fabricated by bending a plate- or sheet-like raw material with multiple substantially flat segments and one or more radii of curvature between pairs of immediately neighboring, substantially flat segments. In some of these embodiments, the cross-section of the housing 31 may include a polygonal profile having an even number of curved or arcuate section 36 and the same even number of connecting portions 34.

It shall be noted that the term "substantially" or "substantial" such as in the "substantially flat plate- or sheet-like structure" or "substantially smooth transition" is used herein to indicate that certain features, although designed or intended to be perfect (e.g., perfectly flat), the fabrication or manufacturing tolerances, the nature of the raw materials used for fabricating these certain features, the slacks in various mating components or assemblies due to design tolerances or normal wear and tear, or any combinations thereof may nonetheless cause some deviations from this designed, perfect characteristic (e.g., "substantially flat" in the case of the housing 31). Therefore, one of ordinary skill in the art will clearly understand and appreciate that the term "substantially" or "substantial" is used here to incorporate or accommodate at least such fabrication and manufacturing tolerances, the slacks in various mating components or assemblies, the nature of the raw materials used for fabricating these certain features, or any combinations thereof.

It shall be further noted that the exemplary stator housing 31 including four sidewall sections 33 is presented for illustration and explanation purposes in one exemplary implementation, and that it is also contemplated that the exemplary stator housing 31 may also include different numbers of sidewall sections or even different cross-sectional profiles having no sidewall sections at all (e.g., a substantially cylindrical housing with or with one or more features extruded from or disposed on the internal or external surfaces of the housing).

In addition or in the alternative, the exemplary housing 31 may be, in some embodiments, inseparably formed or fabricated as a single piece part, for example, by machining the geometries out of a raw tubular or cylindrical raw material or by rolling, folding, by pressing a plate- or sheet-like raw material together with welding, brazing, gluing, bonding (e.g., diffusion bonding), co-sintering, or any other manufacturing processes suitable for joining materials, by various molding processes, or by casting with or with subsequent machining processes to achieve the final geometries within the specified or allowed slacks or tolerances.

In some other embodiments, the exemplary housing 31 may be separably formed or fabricated as multiple individual piece parts and then into the final form by assembly processes with, for example, various types of fasteners or locking mechanisms. The cross-sectional profile of a connecting portion 34 of the exemplary housing 31 includes an arcuate or curved profile in these illustrated embodiments. In these illustrated embodiments, the stator 30 includes four magnets 32 disposed on the internal surface of the housing 31 near the four connecting portions 34 to increase the space utilization in the exemplary motor 21 or to form four pairs of magnetic poles. It shall be noted that by varying the cross-sectional profile of the stator housing 31, the exemplary motors in different embodiments may accommodate different number of magnets, and thus the illustrated exemplary housing 31 including four magnets 32 is presented herein for illustration and explanation purposes, rather than for limiting the scope of the claims or the scope of other embodiments or implementations.

In these embodiments illustrated in FIG. 4 and also in subsequently described FIGS. 4-8 and 11, a magnet 32 includes a two-dimensional boomerang-like profile with a thickness or height in the third dimension along the axial direction of the motor 21, where the central portion of the magnet 32 may be thicker than both end portions. In accordance with an alternative embodiment, a magnet 32 may include a boomerang-like shape having a constant thickness or height in the dimension along the axial direction of the motor 21. In one or more of these FIGS. 4-8 and 11, a magnet 32 may include an arcuate or curved first surface 402 facing the rotor 40 and having one or more radii to define a constant or a variable spacing value between the first surface 402 and the external boundary of the rotor 40 in some embodiments. For example, in the areas where the magnet 32 has thicker portions, the spacing value may decrease to some smaller value(s), whereas in other areas where the magnet 32 has thinner portions, the spacing value may increase to some greater value(s) in some embodiments. In some other embodiments, in the areas where the magnet 32 has thicker portions, the spacing value may increase, whereas in other areas where the magnet 32 has thinner portions, the spacing value may decrease.

In addition, a magnet 32 may further include a second surface opposite to the first surface 402, where the second surface may be configured or designed based at least in part upon the internal surfaces of the housing 31. In some of these embodiments, the entire second surface of the magnet 32 may be configured or designed to substantially mate with at least a part of the internal surface of the corresponding connecting portion 34, at least a part of the internal surface of one or more adjoining sidewall sections 33, or both. In some other embodiments, only a smaller portion of the second surface is configured or designed to contact at least a part of the internal surface of the corresponding connecting portion 34, at least a part of the internal surface of one or more adjoining sidewall sections 33, or both. In various embodiments, the manner to mount a magnet 32 may be determined based at least in part upon the performance characteristics of the motor, a design choice, cost, design or placement of one or more other components, any combinations thereof, etc.

In some of these embodiments, a magnet 32 may overlap with at least a portion of the sidewall section 33 on one or both ends of the magnet 32. In some of these embodiments illustrated in FIG. 4 where a sidewall section 33 includes a substantially flat portion 35 and two curved or arcuate section 36, the curved or arcuate section 36 may have a center O' of curvature that is offset from the center O of the rotor 40 on the plane of the cross-section. In addition or in the alternative, the center curvature of a connecting portion 34 may be coincident with or offset from the center O of the rotor 40.

Therefore, the exemplary motor 21 may thus have a higher capacity to accommodate a larger rotor 40 than a convention motor design. The field coil 42 disposed on the rotor 40 may also become larger due to the additional allowance by the larger rotor 40, thereby rendering motor 21 with a higher performance compared with a conventional motor without the additional allowance. Another advantage of the exemplary motor 21 is that each of its sidewall sections 33 may include a flat portion 35 so the dimensions (e.g., D3 in FIG. 4) may be easily and correctly measured. In FIG. 4, the dimension D4 represents the largest dimension of the housing 31 of the exemplary motor 21.

Figure 5:
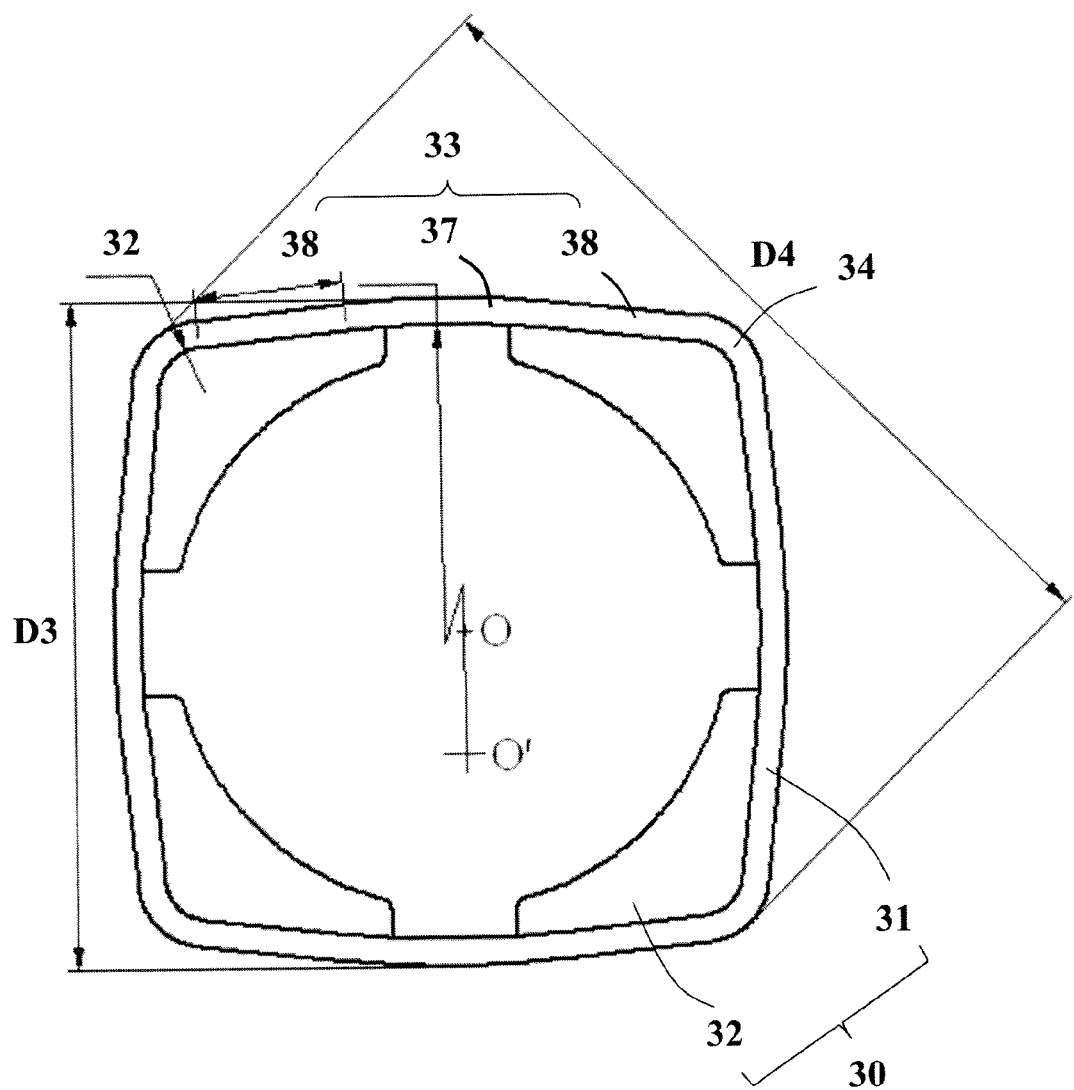
FIG. 5 illustrates another cross-sectional view of another exemplary implementation of a stator of the exemplary motor illustrated in FIG. 3 in some embodiments.

FIG. 5 illustrates a cross-sectional view of another exemplary implementation of a stator of the motor 21 illustrated in FIG. 3 in some embodiments. Similar to the stator housing 31 illustrated in FIG. 4, the stator 30 comprising the stator housing 31 and the magnets 32 in these embodiments includes four connecting portion 34 and four sidewall sections 33. The difference between the stator housing 31 in FIG. 5 and that in FIG. 4 is that a sidewall section 33 of the stator housing 31 in FIG. 5 includes a substantially curved or arcuate portion 37 and two substantially flat portions 38 on each end of the substantially curved or arcuate portion 37 with a substantially smooth transition between the curved or arcuate section 36 and each of the joining substantially flat portion 38. In some of these embodiments, the substantially curved or arcuate portion 37 defines a center "O" of curvature that is offset from the center "O" of the rotor 40 on the plane of the cross-section.

In some of these embodiments, the center of a connecting portion 34 may be coincident with the center "O" of the rotor 40. In some other embodiments, the center of a connecting portion 34 may be offset from the center "O" of the rotor 40. In addition or in the alternative, the plurality of magnets 32 (four illustrated in FIG. 5) may be attached to the internal surfaces of corresponding connection portions 34. In some of these immediately preceding embodiments, some or all of the plurality of magnets 32 may be overlapping with at least a portion the corresponding substantially flat portions 38 for the ease of assembly. As it may be seen from FIG. 5, a magnet 32 may include a boomerang-like shape having a constant or variable thickness.

Figure 6:
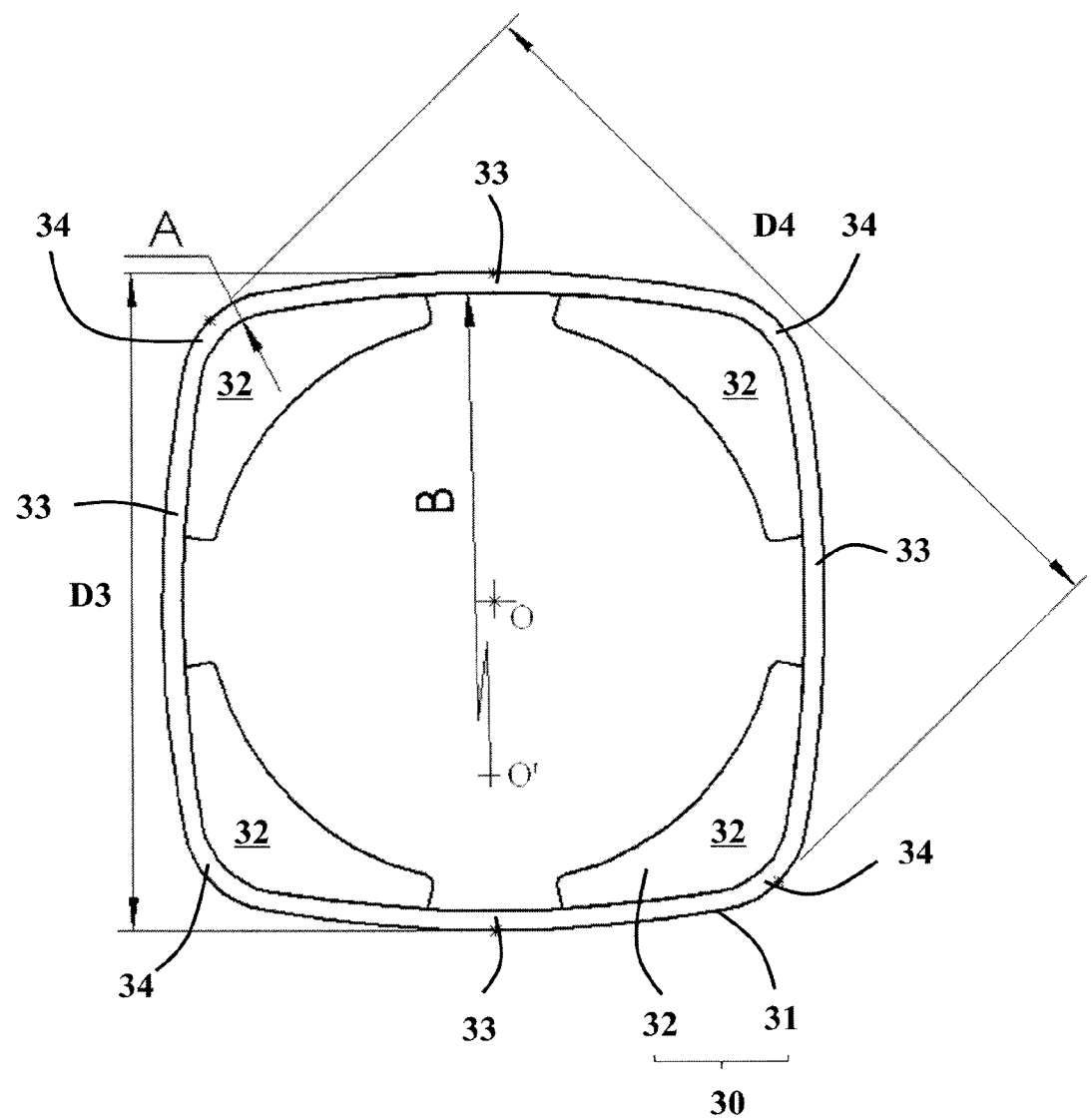
FIG. 6 illustrates another cross-sectional view of another exemplary implementation of a stator of the exemplary motor illustrated in FIG. 3 in some embodiments.

FIG. 6 illustrates a cross-sectional view of another exemplary implementation of a stator of the motor 21 illustrated in FIG. 3 in some embodiments. Similar to the stator housing 31 illustrated in FIGS. 4-5, the stator 30 comprising the housing 31 and the magnets 32 in these embodiments illustrated in FIG. 6 includes four connecting portion 34 and four sidewall sections 33. Each connecting portion 34 is joined with two sidewall sections 33 on both ends of the connection portion 34. The difference between the stator housing 31 in FIG. 4 or 5 and that in FIG. 6 is that each sidewall section 33 in FIG. 6 includes an arcuate section of a constant radius of curvature with two ends joining the respective neighboring connecting portions 34.

In some of these embodiments, the center "O" of an arcuate sidewall section 33 is offset from the center "O" of the rotor 40 on the plane of the cross-section illustrated in FIG. 6. In some of these embodiments, a sidewall section 33 includes an arcuate section of a specific radius and two ends that join the respective neighboring connecting portions 34 to for a smooth transition between the sidewall section 33 and the joining connecting portion 34. In some embodiments, a connecting portion 34 comprises an arcuate section having an arc length with a radius of curvature.

In some of these embodiments, the connecting portion 34 contains only an arcuate section having an arc length (designated as "A" in FIG. 6) having a specific radius of curvature. In some of these embodiments, the arc length of a connecting portion 34 (designated as "A" in FIG. 6) is less than the arc length of a sidewall section 33 (designated as "B" in FIG. 6) that joins the connecting portion 34. In some of the immediately preceding embodiments, the arc length "A" of a connecting portion 34 is smaller than the arc length "B" of a sidewall section 33. In these embodiments, the radius of curvature of the sidewall section 33 is larger than the radius of curvature of the connecting portion 34.

In some embodiments, the radius of curvature of the connecting portion 34 is within a range of 1% to 80% of the radius of curvature of the sidewall section 34. Moreover, D3 and D4 in FIG. 6 respectively represent the largest outside diameter of the housing 31 and the largest distance between two opposing sidewall sections 33. In some embodiments, the plurality of magnets 32 are installed in areas that are farthest away from the center of the rotor 40 to improve space utilization in the internal space within the housing 31. As it may be seen from FIG. 6, a magnet 32 may have a boomerang-like shape with a constant or variable thickness. In some of the embodiments illustrated in FIG. 6, the plurality of magnets 32 are installed in the four corners defined by the four connecting portions 34 and the four sidewall sections 33 of the housing 31, and these four corners represent areas that are farthest away from the center of the rotor 40 to improve space utilization in the internal space within the housing 31.

In some embodiments, a magnet 32 is disposed in a corner defined by a connecting portion 34 and two joining sidewall portions 34. In addition or in the alternative, the rotor 40 and the plurality of magnets 32 are configured or designed in such a way that there exist an air gap between the first surface 602 facing the rotor 40 of a magnet 32 and the external surface of the rotor 40. In some of these embodiments, the air gap comprises a substantially constant or uniform spacing between the first surface 602 and the external surface of the rotor 40. In some other embodiments, the air gap comprises more than one spacing value between the first arcuate or curved surface 602 and the external surface of the rotor 40.

For example, the air gap in the area corresponding to the thicker portion of a magnet 32 may be greater than that in another area corresponding to a thinner portion of the magnet 32 in some embodiments. In some other embodiments, the air gap in the area corresponding to the thicker portion of a magnet 32 may be smaller than that in another area corresponding to a thinner portion of the magnet 32 in some embodiments. In those embodiments where the air gap is not uniform, the non-uniform air gap may help to improve cogging torque, detent, or no-current torque.

In addition, the thickness of the housing 31 may be substantially uniform in some embodiments. In some other embodiments, the housing 31 may have non-uniform thickness. For example, the portion of the housing 31 for connecting with other components (e.g., the end cap) or for meeting higher strength requirements may have a greater thickness or additional features (e.g., structural stiffeners, etc.) than portions of the housing that does not need to accommodate these features or requirements. In some embodiments, the arcuate or curved first surface 602 may comprise a substantially flat or a substantially curved or arcuate surface facing the rotor 40. It shall be noted that the four sidewall sections 33 may or may not have a uniform thickness or profile, and that the four connecting portions 34 may or may not have a uniform thickness or profile. In some embodiments, the sidewall sections 33 have the same thickness as that of the four connecting portions 34. In some other embodiments, the sidewall sections 33 have a different thickness from that of the four connecting portions 34.

Figure 7:
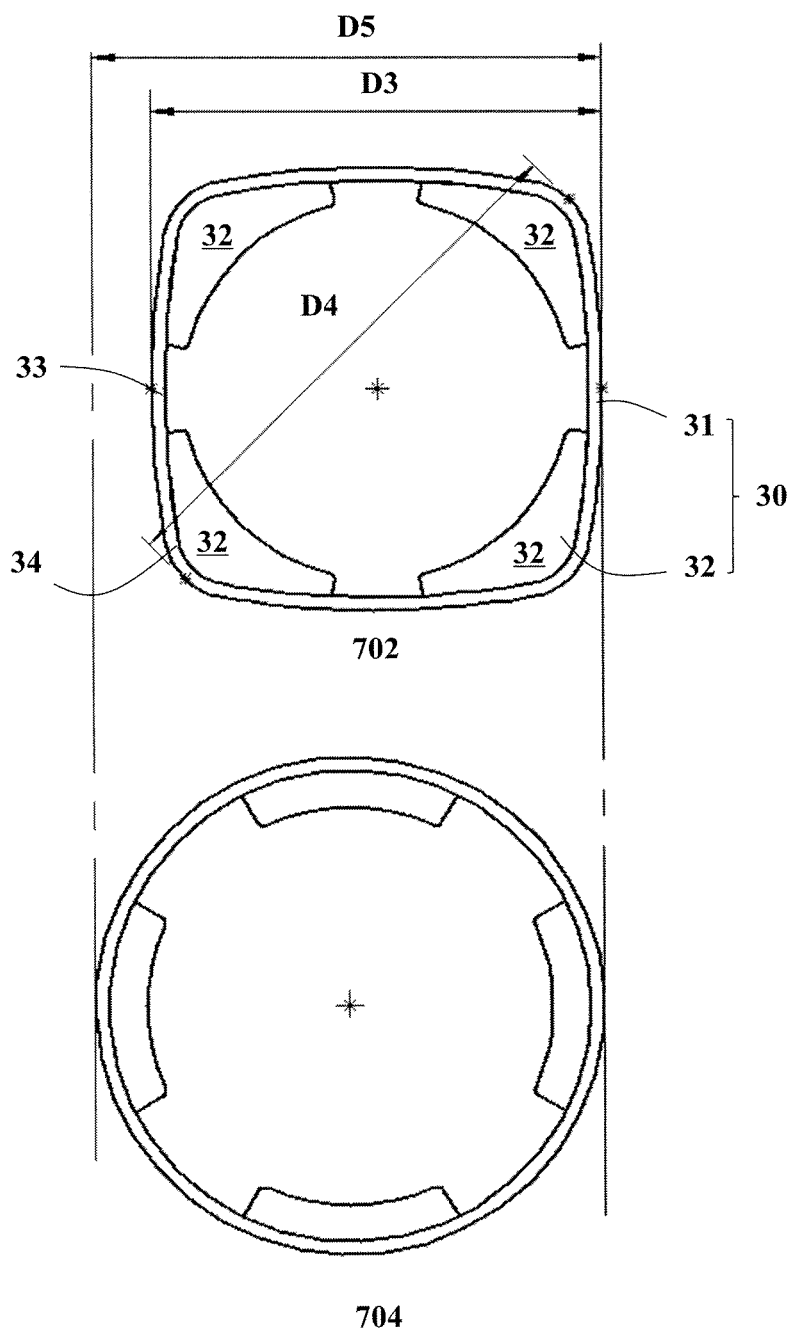
FIG. 7 illustrates a comparison between an improved stator and a conventional stator in some embodiments.

FIG. 7 illustrates a comparison between an exemplary, improved stator 702 in accordance with some embodiments and a conventional stator 704. Stator 702 includes, as previously described, four magnets 32 disposed in the stator housing 31 having the four corners defined by the respective connecting portions 34 and sidewall sections 33. Practical implementations have proven that motors having the stator 702 have substantially identical or even better performance characteristics as motors having the conventional stator 704.

In addition, with the dimension D4 in FIG. 7 configured or designed to be identical to the dimension D5 of the conventional stator 704, the internal space within the housing for the exemplary, improved stator 702 is substantially equivalent to or greater than that within the housing for the conventional stator 704. Consequently, other than accommodating larger magnets 32, the exemplary, improved stator 702 may nonetheless have sufficient space to accommodate the all components that may fit within the conventional stator 704. As it may be seen from FIG. 7 with the dimension D4 being identical to or substantially identical to the dimension D5 of the conventional stator 704, the dimension D3 in the exemplary, improved stator 702 is clearly smaller than dimension D5 of the conventional stator 704. As a result, the cross-sectional area of the exemplary, improved stator 702 (and hence that of the corresponding motor) is smaller the cross-section area of the conventional stator 704 in this example.

Consequently, with the same internal components or even with larger internal components (e.g., a larger rotor as previously described), the volume occupied by the exterior boundaries of the exemplary, improved stator 702 is thus smaller than that occupied by the exterior boundaries of the convention stator 704. In other words, the power density, which is defined as the output power per unit volume of a motor, of the exemplary, improved motor including the stator 702 is greater than that of the conventional motor including the conventional stator 704. The power density of the exemplary, improved motor 21 may be further increased by incorporating larger components (e.g., a larger rotor 40, larger magnets 32, or both) into the exemplary, improved motor including the stator 702. One of the advantages of exemplary, improved motors described in various embodiments is that these motors are particularly useful in applications requiring or desiring a motor to occupy less space or in applications where space is constrained.

Figure 8:
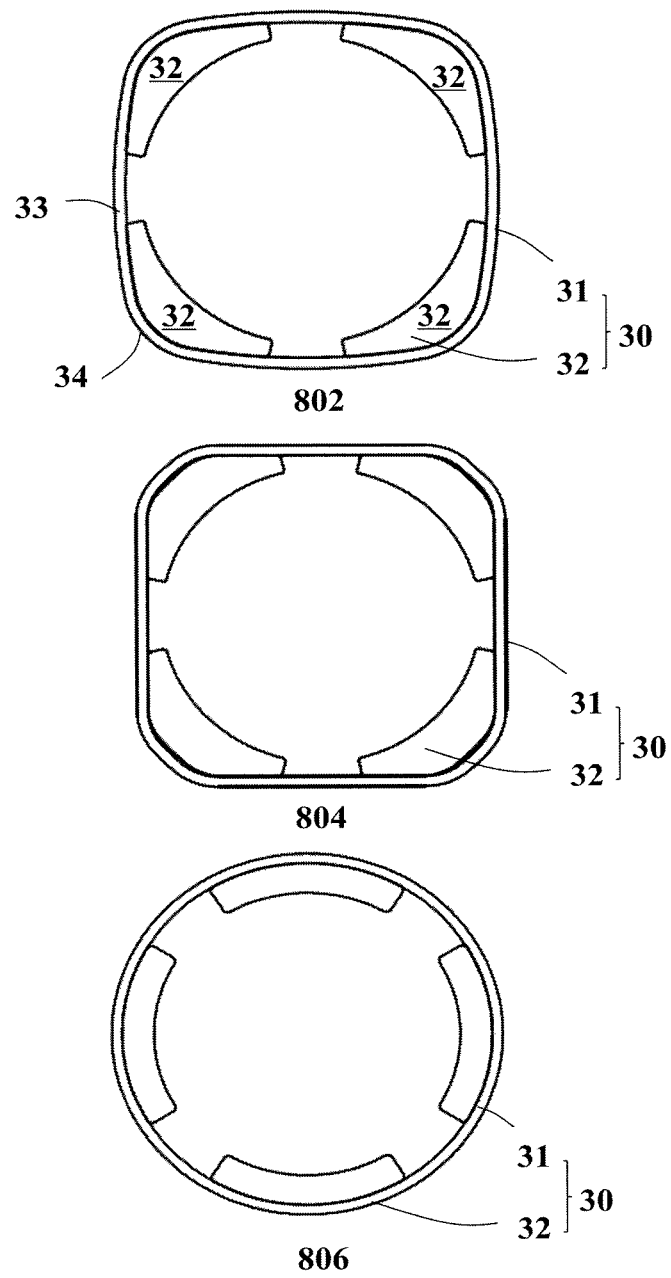
FIG. 8 illustrates a comparison among three stators including two exemplary, improved stators and one conventional stator in some embodiments.

FIG. 8 illustrates a comparison among three stators including two exemplary, improved stators 802 and 804 and one conventional stator 806 in some embodiments. More specifically, stator 30 as shown in 802 includes four magnets 32 within the stator housing 31 having four sidewall sections 33 and four connecting portions 34, as illustrated in FIG. 6; stator 804 is a square stator as described in Chinese patent application no. CN 200810216336.6; and the conventional stator 30 as shown in 806 includes a circular stator housing 31 and four magnets 32.

Figure 9:
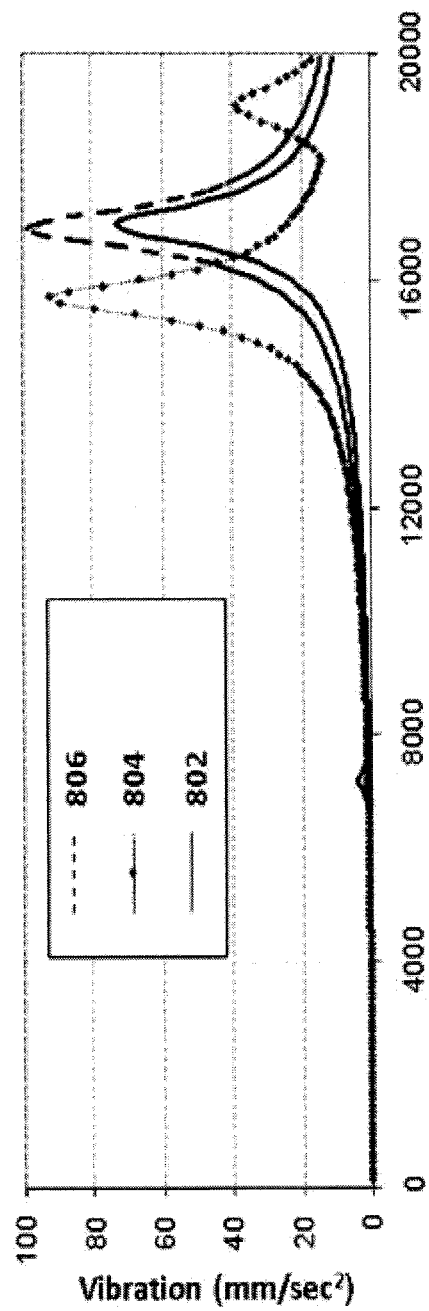
FIG. 9 illustrates respective frequency response models within a range between zero and 20,000 hertz of the three stators illustrated in FIG. 8 subject to some input force vectors in some embodiments.
Figure 10:
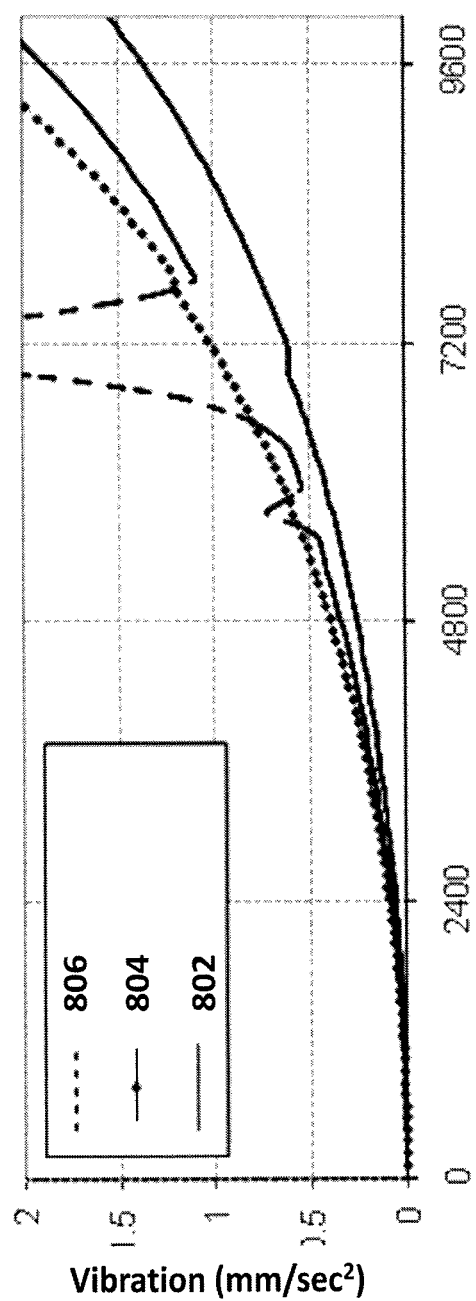
FIG. 10 illustrates respective frequency response models within a range between zero and around 9,600 hertz of the three stators illustrated in FIG. 8 subject to some input force vectors in some embodiments.

By way of example, three motors including respective stators 802, 802, and 806 are configured to have substantially identical performance characteristics under the same input and with the same load. FIGS. 9-10 illustrate some analytical results of the three motors with the illustrated stators 802, 804, and 806 that are under substantially the same operating condition, e.g., subject to the same external, applied force vectors.

FIG. 9 illustrates the frequency responses within a range between zero and 20,000 hertz of the three stators 802, 804, and 806 illustrated in FIG. 8 subject to some input force vectors in some embodiments. More specifically, FIG. 9 illustrates some finite element analysis results of the frequency responses of the three illustrated stators 802, 804, and 806, where the abscissa represents the frequency in hertz, and the ordinate represents the amplitudes of the vibrations in millimeters per square second (mm/sec$^2$).

As indicated in FIG. 9, the exemplary, improved stator 802 exhibits significantly improved frequency response or attenuated vibration, with about 35% reduction in peak amplitude of vibration in comparison with stator 804 and about 45% reduction in peak amplitude of vibration in comparison with stator 806 in this example. One advantage of various improved motors is that these motors, under substantially identical operating conditions, produce lower noises compared to prior art motors having the stator designs 804 and 806 due to the reduced level of vibration as illustrated in FIG. 8.

FIG. 10 illustrates frequency responses within a range between zero and around 9,600 hertz of the three stators 802, 804, and 806 illustrated in FIG. 8 subject to some input force vectors in some embodiments. More specifically, FIG. 10 illustrates some finite element analysis results of the frequency response of the three illustrated stators 802, 804, and 806, where the abscissa represents the frequency in hertz, and the ordinate represents the amplitudes of the vibrations in millimeters per square second (mm/sec$^2$).

As illustrated in FIG. 10, the exemplary, stator 802 exhibits substantial improved frequency response within the range between zero and around 9,600 hertz with around 50% (through extrapolation) reduction in vibration amplitude in the frequency range compared with stator 804 and nearly 75% reduction in vibration amplitude (through extrapolation) compared with stator 806 in this example. As FIG. 10 illustrated, various improved, exemplary motors produce much lower noise levels when compared to conventional motors having the illustrated stator designs as shown in 804 and 806 in the frequency range between zero and around 9,600 hertz.

Figure 11:
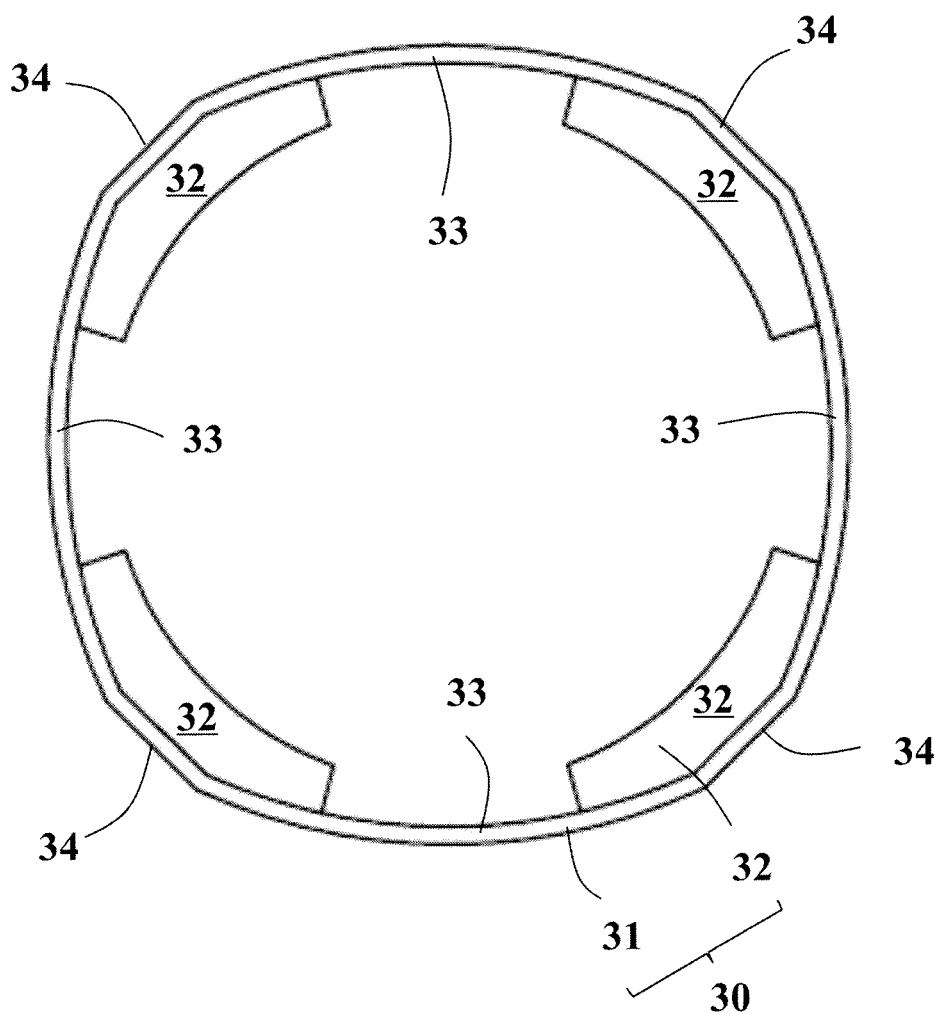
FIG. 11 illustrates another cross-sectional view of another exemplary implementation of a stator of the exemplary motor in some embodiments.

FIG. 11 illustrates a cross-sectional view of another implementation of a stator housing 31 of the motor 21 in some embodiments. The stator 30 including a stator housing 31 and four magnets 32 illustrated in FIG. 11 is similar to that illustrated in FIG. 3. The exemplary stator housing 31 illustrated in FIG. 11 is different from that illustrated in FIG. 3 in that, instead of being a curved or arcuate segment, a connection portion 34 in the illustrated stator housing 31 is a substantially straight segment, while the sidewall section 33 includes a curved or arcuate section having one or more radii of curvature in some embodiments.

In some of these illustrated embodiments, the length of a connection portion 34 is smaller than the arc length of a sidewall section 33. It shall be noted when the stator housing 31 illustrated in FIG. 11 is formed by, for example, bending and a material joining process (e.g., brazing, welding, gluing, etc.), the area where the connecting portion 34 joins a sidewall section 33 may exhibit a bend radius of curvature defined by the bending apparatus, although the connecting portion 34 is configured or designed to be a substantially flat segment. From a two-dimensional perspective illustrated in FIG. 11, a substantially flat connecting portion 34 appears like a chamfering feature for two neighboring sidewall sections 33 joining the substantially flat connecting portion 34.

Figure 12:
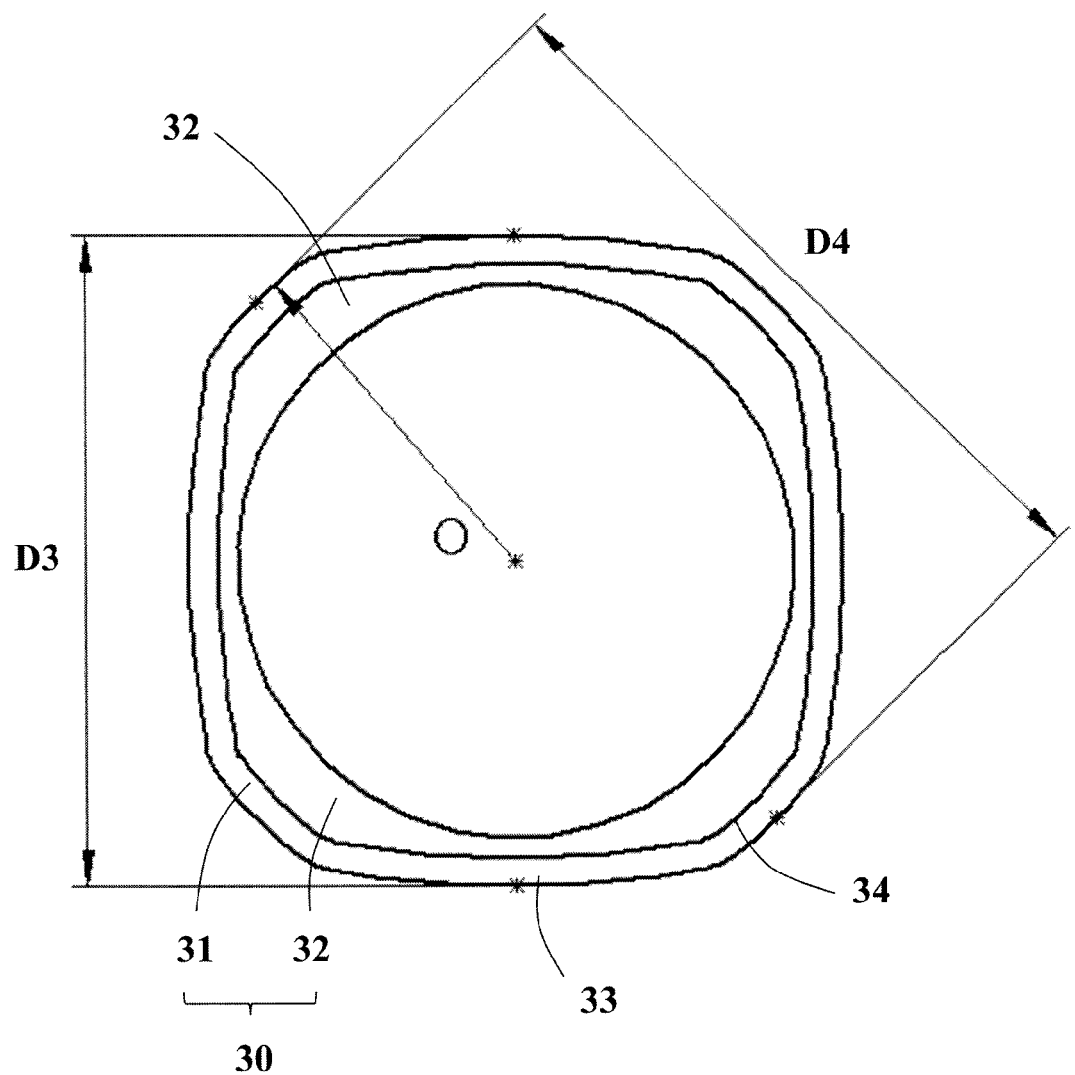
FIG. 12 illustrates another cross-sectional view of another exemplary implementation of a stator of the exemplary motor in some embodiments.

FIG. 12 illustrates a cross-sectional view of another implementation of the stator housing 31 of motor 21 in some embodiments. The stator 30 including a stator housing 31 may also include a single piece magnet 32 which, when installed in a motor 21 including the illustrated stator housing 31, surrounds a rotor in some embodiments. In some of these embodiments the magnet 32 may define a circular opening to accommodate, for example, the rotor, while providing or defining a substantially uniform spacing between the inside diameter of the magnet 32 and the outside diameter of the rotor.

In some other embodiments, the multi-piece magnets 32 may include an irregular opening to provide non-uniform spacing between the internal contour of the multi-piece magnets 32 and the outside diameter of the rotor in similar manners as those described for FIG. 6. In some of these embodiments, the multi-piece magnets 32 include four magnetic poles that correspond to the four connecting portions 34. In some of these embodiments, the curvature of a connecting portion 34 is different from that of a sidewall section 33. In some of these embodiments, the center of a connecting portion 34 coincides with the center of the rotor.

The invention claimed is:

1. A torque transmitting device, comprising:
   a clutch assembly including a driving member and a driven member; and
   a motor operatively coupled to one of the driving member and the driven member of the clutch assembly and configured to engage the driven member with the driving member, the motor including:
      a rotor including a shaft and a field coil wound around a portion of the shaft; and
      a stator surrounding at least a portion of the rotor and including:
         a housing, including:
            at least three sidewall sections, a sidewall section of the at least three sidewall sections comprising a first curved segment having a first radius of curvature; and
            at least three connecting portions, wherein each connecting portion is between two of the at least three sidewall sections; and
         a first magnet disposed within the housing and attached to at least a portion of an internal surface of a first connecting portion of the at least three connecting portions,
   wherein a connecting portion of the at least three connecting portions of the housing of the stator of the motor comprising a second curved segment adjoining two neighboring sidewall sections and having a second radius of curvature in a range between 1% and 80% of the first radius of curvature.

2. The torque transmitting device of claim 1, further comprising:
   a hydraulic assembly operatively coupled to the motor; and
   an actuator operatively coupled to the hydraulic assembly and to the one of the driving member and the driven member of the clutch assembly.

3. The torque transmitting device of claim 1, further comprising a gear assembly having a gear and a pinion and operatively coupled to the driving member of the clutch assembly.

4. The torque transmitting device of claim 1, the motor further comprising a second magnet disposed within the housing and attached to at least a portion of an internal surface of a second connecting portion of the at least three connecting portions.

5. The torque transmitting device of claim 1, the first magnet of the motor maintaining a spacing value from a first magnet surface facing the rotor to an external surface of the rotor, wherein the spacing value varies along a circumferential direction with respect to an axis of shaft of the rotor based at least in part upon a radial thickness of the first magnet along a radial direction emanating from and perpendicular to the axis of shaft of the rotor.

6. The torque transmitting device of claim 1, wherein the connecting portion of the at least three connecting portions of the housing of the stator of the motor comprises a substantially flat segment and adjoins two neighboring sidewall sections of the at least three sidewall sections.

7. The torque transmitting device of claim 1, wherein the sidewall section of the at least three sidewall sections of the housing of the stator of the motor further comprises a third curved segment having a third radius of curvature, and the third curved segment has a first end adjoining the first curved segment and a second end adjoining a neighboring connecting portion of the at least three connecting portions.

8. The torque transmitting device of claim 1, wherein a sidewall section of the at least three sidewall sections of the housing of the stator of the motor further comprises a substantially flat segment having a first end adjoining the first curved segment and a second end adjoining a neighboring connecting portion of the at least three connecting portions.

9. The torque transmitting device of claim 1, the first magnet of the motor comprising a central portion and two end portions sandwiching the central portion, wherein a radial thickness of the central portion along a radial direction emanating from an axis of the shaft of the rotor is greater than a radial thickness of the two end portions.

10. A vehicle powertrain, comprising:
    a drive shaft having a first end portion operatively coupled to an engine of the vehicle powertrain and a first set of axles;
    a torque transmitting device operatively coupled to a second end portion of the drive shaft and comprising:
       a clutch assembly including a driving member and a driven member; and
       a motor operatively coupled to one of the driving member and the driven member of the clutch assembly and configured to engage the driven member with the driving member, the motor including:
          a rotor including a shaft and a field coil wound around a portion of the shaft; and
          a stator surrounding at least a portion of the rotor and including:
             a housing, including:
                at least three sidewall sections, a sidewall section of the at least three sidewall sections comprising a first curved segment having a first radius of curvature; and
                at least three connecting portions, wherein each connecting portion is between two of the at least three sidewall sections; and
             a first magnet disposed within the housing and attached to at least a portion of an internal surface of a first connecting portion of the at least three connecting portions; and
    a second set of axles operatively coupled to the torque transmitting device,
    wherein a sidewall section of the at least three sidewall sections of the housing of the stator of the motor further comprises a substantially flat segment and a second curved segment having a second radius of curvature, the flat segment having a first end adjoining the first curved segment and a second end, the second curved segment having a first end adjoining the second end of the flat segment and a second end adjoining a neighboring connecting portion of the at least three connecting portions.

11. The vehicle powertrain of claim 10, the torque transmitting device comprising:
- a hydraulic assembly operatively coupled to the motor; and
- an actuator operatively coupled to the hydraulic assembly and to the one of the driving member and the driven member of the clutch assembly.

12. The vehicle powertrain of claim 10, the torque transmitting device further comprising a gear assembly having a gear and a pinion and operatively coupled to the driving member of the clutch assembly.

13. The vehicle powertrain of claim 10, wherein the connecting portion of the at least three connecting portions of the housing of the stator of the motor comprising a third curved segment adjoining two neighboring sidewall sections and having a third radius of curvature in a range between 1% and 80% of the first radius of curvature.

14. The vehicle powertrain of claim 10, the motor further comprising a second magnet disposed within the housing and attached to at least a portion of an internal surface of a second connecting portion of the at least three connecting portions.

15. The vehicle powertrain of claim 10, the first magnet of the motor maintaining a spacing value from a first magnet surface facing the rotor to an external surface of the rotor, wherein the spacing value varies along a circumferential direction with respect to an axis of shaft of the rotor based at least in part upon a radial thickness of the first magnet along a radial direction emanating from and perpendicular to the axis of shaft of the rotor.

16. The vehicle powertrain of claim 10, wherein a connecting portion of the at least three connecting portions of the housing of the stator of the motor comprises a substantially flat segment and adjoins two neighboring sidewall sections of the at least three sidewall sections.

17. The vehicle powertrain of claim 10, the first magnet of the motor comprising a central portion and two end portions sandwiching the central portion, wherein a radial thickness of the central portion along a radial direction emanating from an axis of the shaft of the rotor is greater than a radial thickness of each of the two end portions.

* * * * *